United States Patent
Arsanjani et al.

(10) Patent No.: US 9,473,509 B2
(45) Date of Patent: Oct. 18, 2016

(54) SELECTIVELY PERMITTING OR DENYING USAGE OF WEARABLE DEVICE SERVICES

(71) Applicant: INTERNATIONAL BUSINESS MACHINES CORPORATION, Armonk, NY (US)

(72) Inventors: Ali P. Arsanjani, Fairfield, IA (US); Ahamed Jalaldeen, Karnataka (IN); Shihabudheen V. Kavungathodika, Malappuram (IN); Dilip S. Muthukurussi Mana, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 14/500,153

(22) Filed: Sep. 29, 2014

(65) Prior Publication Data

US 2016/0094563 A1 Mar. 31, 2016

(51) Int. Cl.
*G06F 7/04* (2006.01)
*G06F 15/16* (2006.01)
(Continued)

(52) U.S. Cl.
CPC .............. *H04L 63/107* (2013.01); *G06F 21/71* (2013.01); *G06F 2221/21* (2013.01); *G06F 2221/2111* (2013.01); *H04W 48/00* (2013.01); *H04W 48/02* (2013.01)

(58) Field of Classification Search
CPC .............. H04W 48/00; H04W 48/02; H04W 48/0204; G06F 2221/2111; G06F 21/71
USPC .......................................................... 726/4
See application file for complete search history.

(56) References Cited

U.S. PATENT DOCUMENTS 8,086,677 B2 * 12/2011 Murphy .............. H04L 12/5885
709/206
8,219,144 B2 7/2012 Benco et al.
(Continued)

FOREIGN PATENT DOCUMENTS

CN 100477678 C 4/2009
EP 2068536 B1 5/2013
(Continued)

OTHER PUBLICATIONS

Jasper Scheffel et al., "Wearable Web Technology: Google Glass and the Mirror API", MSc Media Technology, Leiden University, 2013.
(Continued)

*Primary Examiner* — Jayesh Jhaveri
(74) *Attorney, Agent, or Firm* — Ronald A. Kaschak, Esq.; Matthew M. Hullihan, Esq.; Heslin Rothenberg Farley & Mesiti, PC

(57) ABSTRACT

Selectively permitting or denying usage of a service available on a device is provided. Usage restrictions on usage of services available on the device are maintained, the usage restrictions including customizable restrictions on usage of the services available on the device. A usage restriction for a service indicates usage parameter(s) of the device under which the service is usable or is unusable to users of the device. Based on detecting an event associated with the device, current usage parameter(s) of the device are identified and compared to usage parameter(s) indicated by a usage restriction to determine whether the service is to be usable or unusable. Usage of the service by a user of the device is then permitted or denied based the comparison.

19 Claims, 9 Drawing Sheets

(51) Int. Cl.
*H04L 29/06* (2006.01)
*H04W 48/00* (2009.01)
*G06F 21/71* (2013.01)
*H04W 48/02* (2009.01)

(56) References Cited

U.S. PATENT DOCUMENTS

| | | | | |
|---|---|---|---|---|
| 8,250,648 | B2* | 8/2012 | Kabzinski | G06F 21/78 |
| | | | | 711/100 |
| 8,254,902 | B2 | 8/2012 | Bell et al. | |
| 2003/0074320 | A1* | 4/2003 | Riggs | G06F 21/10 |
| | | | | 705/51 |
| 2005/0096009 | A1* | 5/2005 | Ackley | H04M 1/663 |
| | | | | 455/405 |
| 2006/0019645 | A1* | 1/2006 | Azimi | H04M 1/7253 |
| | | | | 455/419 |
| 2007/0073874 | A1* | 3/2007 | Moghaddam | G06F 17/30867 |
| | | | | 709/224 |
| 2007/0214001 | A1* | 9/2007 | Patron | G06Q 10/109 |
| | | | | 726/3 |
| 2007/0281603 | A1* | 12/2007 | Nath | G08B 21/06 |
| | | | | 455/1 |
| 2007/0294746 | A1* | 12/2007 | Sasakura | B60R 25/2018 |
| | | | | 726/2 |
| 2010/0017874 | A1* | 1/2010 | Piccinini | G06F 21/71 |
| | | | | 726/18 |
| 2010/0227629 | A1* | 9/2010 | Cook | H04W 64/00 |
| | | | | 455/456.4 |
| 2011/0231892 | A1* | 9/2011 | Tovar | H04L 63/10 |
| | | | | 726/1 |
| 2012/0151562 | A1* | 6/2012 | Ortiz | H04N 5/232 |
| | | | | 726/4 |
| 2012/0239173 | A1* | 9/2012 | Laikari | A61B 5/1112 |
| | | | | 700/91 |
| 2012/0240195 | A1* | 9/2012 | Weiss | H04L 63/0846 |
| | | | | 726/4 |
| 2012/0316456 | A1* | 12/2012 | Rahman | G06F 1/163 |
| | | | | 600/547 |
| 2013/0232584 | A1* | 9/2013 | Baentsch | G06F 21/10 |
| | | | | 726/29 |
| 2013/0258270 | A1 | 10/2013 | Cazalet et al. | |
| 2014/0041038 | A1* | 2/2014 | Lessin | G06Q 50/01 |
| | | | | 726/26 |
| 2014/0123309 | A1* | 5/2014 | Jung | G06F 21/6245 |
| | | | | 726/27 |
| 2014/0123323 | A1* | 5/2014 | Jung | H04L 41/5054 |
| | | | | 726/30 |
| 2015/0077224 | A1* | 3/2015 | Pal | G06F 21/35 |
| | | | | 340/5.61 |
| 2015/0237072 | A1* | 8/2015 | Nukala | H04L 63/20 |
| | | | | 726/1 |
| 2016/0072821 | A1* | 3/2016 | Wu | H04L 69/16 |
| | | | | 726/4 |

FOREIGN PATENT DOCUMENTS

| | | |
|---|---|---|
| KR | 100986453 B1 | 10/2010 |
| KR | 101024442 B1 | 3/2011 |
| WO | 2004089021 A2 | 10/2004 |
| WO | 2013043228 A1 | 3/2013 |
| WO | 2013124602 A1 | 8/2013 |

OTHER PUBLICATIONS

Samuel Greengard, "Google Glass Poses Threats for the Enterprise", Aug. 16, 2013, http://www.baselinemag.com/security/google-glass-poses-threats-for-the-enterprise.

Katina Michael et al., "Computing Ethics No Limits to Watching?" Communications of the ACM, vol. 56, No. 11, Nov. 2013.

"Location Based Automatic Sound Profile Switching Application in Android Mobiles" International Journal of Computer & Communication Technology ISSN, pp. 84-87, vol. 4, No. 2, 2013.

* cited by examiner

SELECTIVELY PERMITTING OR DENYING USAGE OF WEARABLE DEVICE SERVICES

BACKGROUND

Recent developments in computer technology have made it increasingly convenient to incorporate small, internet-connected devices into our everyday lives. Example devices include battery-powered, generally handheld (or smaller) devices meant to be carried or worn by the user. This so-called "wearable technology" typically serves practical purposes by, for instance, providing relevant information based on context, helping users stay organized, facilitating communication with others, and tracking user health markers, as examples. Specific examples of wearable technology include Google Glass™ (offered by Google Inc., Mountain View, Calif., USA) and smartwatches, such as those offered by Samsung Group (Suwon, South Korea) and LG Corporation (Seoul, South Korea).

With the conveniences offered by wearable technology come potential privacy concerns and safety issues because of the tendency for users to become distracted by the technology. Some jurisdictions have banned users from wearing such devices in various places, such as movie theaters, or while engaging in targeted activities, such as operating a motor vehicle. However, many times, it is unknown how, or even if, the device was actually being used at the time, and users may be subject to fines or other punishments regardless of whether the device was being used for illicit purposes.

BRIEF SUMMARY

Shortcomings of the prior art are overcome and additional advantages are provided through the provision of a method that includes maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device under which the service is usable or is unusable to users of the wearable device; based on detecting an event associated with the wearable device, identifying at least one current usage parameter of the wearable device; comparing the identified at least one current usage parameter and the indicated at least one usage parameter indicated by the usage restriction to determine whether the service is to be usable or unusable; and permitting or denying, by a processor, based the comparing, usage of the service by a user of the wearable device.

Further, a computer system is provided that includes a memory and a processor in communication with the memory, wherein the system is configured to perform a method including: maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device under which the service is usable or is unusable to users of the wearable device; based on detecting an event associated with the wearable device, identifying at least one current usage parameter of the wearable device; comparing the identified at least one current usage parameter and the indicated at least one usage parameter indicated by the usage restriction to determine whether the service is to be usable or unusable; and permitting or denying based the comparing, usage of the service by a user of the wearable device.

Yet further, a computer program product is provided that includes a computer readable storage medium having program instructions embodied therewith, the program instructions executable by a processor to cause the processor to perform a method including: maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device under which the service is usable or is unusable to users of the wearable device; based on detecting an event associated with the wearable device, identifying at least one current usage parameter of the wearable device; comparing the identified at least one current usage parameter and the indicated at least one usage parameter indicated by the usage restriction to determine whether the service is to be usable or unusable; and permitting or denying, based the comparing, usage of the service by a user of the wearable device.

Additional features and advantages are realized through the concepts of aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
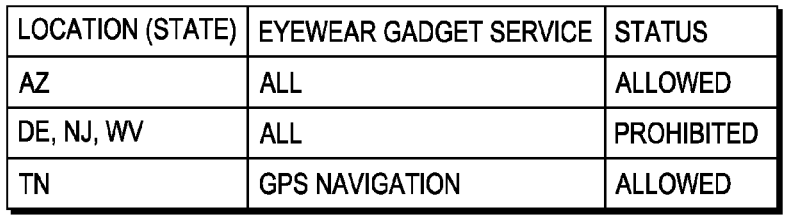
FIG. 1 depicts example usage restriction tables to facilitate device usage restriction enforcement, in accordance aspects described herein.
Figure 1:
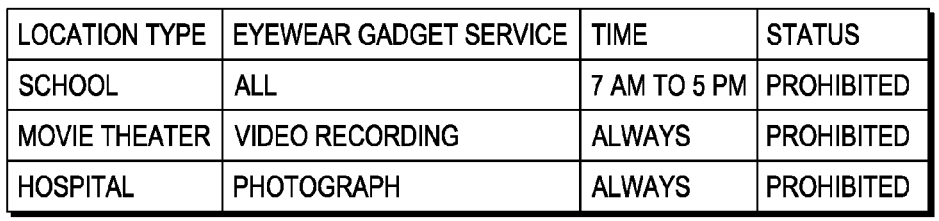
Figure 1:
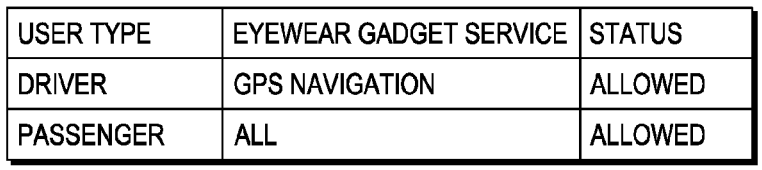
Figure 1:
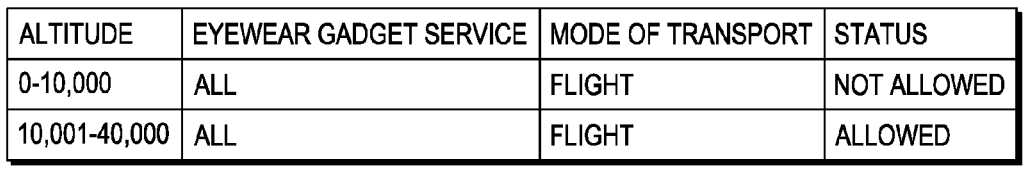

Problems can arise when wearable technology has the potential to interfere with public safety. The Google Glass™ wearable technology, for instance, has the ability to stream video to a user. If the user is driving a car while watching a video via the head-mounted display, this is considered a highly dangerous situation. Consequently, some jurisdictions have begun issuing tickets to drivers who wear particular forms of wearable technology while driving their cars. This is without regard to the fact that the device may not have even been in use at the time of the alleged infraction.

Current wearable technology lacks the ability to enforce usage restrictions on its services. Accordingly, aspects described herein provide facilities restricting device usage based on device usage parameters. Using the example above, it may be beneficial to restrict the playback of video when a user is driving a motorized vehicle. An appropriate usage restriction in that case may be to disable playback of video while the vehicle is in motion and the user is the driver of the vehicle. More generally, it may be desired to disable all functions of the device itself in this context. Usage restrictions can be based on various usage parameter types, such as location, location type/venue (such as hospitals, theaters, schools), user type (such as airline travelers, pilots, drivers, automobile passengers), altitude, and time, as examples.

Further aspects described herein provide protections for consumers from accusations of violations and their consequences by automatically enabling and disabling the ability to use services in prohibited scenarios and maintaining an audit log of such enabling/disabling. The log can be stored in a secure manner so that it can be offered to authorities or other entities to establish whether a targeted service/activity was actually enabled for use at a given time. Example services/activities include programs or functions performed by the wearable device, such as video playback or web browsing, as examples.

Aspects described herein are enabled, in part, through the creation of usage restriction tables (or other forms of data stores) for use by the wearable device. Usage restriction tables can periodically synchronize with data of external servers so that updates to the usage restrictions can be applied. The tables indicate the particular restrictions that exist given particular usage parameters. Usage parameters describe context in which the device is being used. Example usage parameters include time, user-type, location, location-type, or any other parameter describing a context under which a service may be executed.

The usage restriction tables can be maintained at a more privileged level than the user level of the device, to prevent tampering with the restrictions. In some cases, the usage restriction tables can be offered as a service provided from an external server with which the individual device can synchronize. Additionally or alternatively, the usage restriction tables may be stored on the device.

The occurrence of specific events (like driving a car, being above a particular altitude, etc.) can be monitored using existing facilities of the wearable technology. Many forms of wearable technology include a GPS device, for instance, that is useful for pinpointing a user's location. Other input devices, such as a camera, microphone, accelerometer, or compass, as examples, can provide current usage context of the device. Events can trigger the identification of services that are in use (running) on the device and the disabling of services that are prohibited given the current context. Events can also be used to enable a previously disabled service. Services can be programs, modules, applications, etc. that are for execution at any privilege level, such as the kernel privilege level or the user privilege level.

Given particular events, usage restrictions can be verified based on the usage restriction tables. For any relevant service, it can be determined whether the particular service is prohibited from use in the current scenario, i.e. the current usage context as determined via the current usage parameters of the device. If any services are restricted or prohibited given the current scenario, then the device can automatically stop and disable use of the service. It can also present a notification to the user explaining the reason for the stoppage.

Since sometimes these services are provided on the client device but they take direction from a server (such as GPS navigation being served to a client), in some aspects, disabling the use of the service involves actions by the server to deny usage of the service at the client. This can be implemented by the server refraining from providing necessary information to the device, for instance. Additionally or alternatively, device parameters can be provided to the server and the server can determine whether to stop/disable usage of the service.

To facilitate additional aspects, audit log entries can be made that indicate which services were stopped/disabled and started/enabled at any given time. This may be helpful in legal matters like when the user is ticketed for driving while wearing a wearable device. The driver may offer the secure log to help establish that the prohibited service(s) was/were in fact disabled at the time of the alleged infraction.

Example processes described herein provide:

Event-based device usage restriction enforcement: This enforces usage restrictions on device services that are in use when a relevant event occurs, such as migrating across state lines or entering a hospital, as examples. This can also include event-based triggering of a check of the currently disabled services to determine whether they can be re-enabled.

Enforcement of service usage restrictions based on an attempted service startup: This can prevent a service from being started by a user under a prohibited context, for instance when startup of a web-browser is prohibited if the user is currently operating a motor vehicle.

Determination of whether usage of a service is permitted based on current usage parameters: This may be called by the other processes when needed to determine whether usage of a particular service is permitted under the current usage parameters.

FIG. 1 depicts example usage restriction tables to facilitate device usage restriction enforcement, in accordance aspects described herein. Usage restriction table 102 depicts example location-based restrictions. Different geographic areas, for instance areas corresponding to towns, counties, states, countries, etc., may have their own rules and regulations on usage of wearable devices under different contexts. Usage restriction table 102 presents example restrictions on eyewear gadget use by a driver of a motor vehicle. These examples are purely hypothetical and not representative of the actual laws of the indicated states.

Arizona (AZ) does not restrict usage of eyewear gadgets while driving a vehicle (all eyewear gadget services are allowed when the driver is in the state of Arizona). Delaware (DE), New Jersey (NJ), and West Virginia (WV) state laws explicitly prohibit usage of all eyewear gadget services while the user is driving a vehicle. Instead of providing three different entries in table 102, it is seen that they can be compacted into a single entry when multiple (DE, NJ, WV) have identical restrictions.

Tennessee (TN) explicitly allows usage of the GPS navigation service of the eyewear gadget, but does not indicate whether the other eyewear gadget services are allowed or prohibited. In these cases, a default restriction (i.e. of either "allowed" or "prohibited") can be applied to eyewear gadget services that are not addressed by a usage restriction.

An example event that may trigger processing described herein is detection that a user crosses state lines. Passage into the new jurisdiction while engaging in the activity (using the eyewear gadget while driving) may unknowingly subject the user to fines. The processing of FIG. 2, described below, could be invoked upon occurrence of that event in order to automatically disable the prohibited service(s) while the user is present in that entered state.

Usage restriction table 104 depicts example restrictions based on location-type. Certain location-types can have restrictions on usage of eyewear gadget services when the user is within delineated boundaries. In table 104, a school location-type may prohibit usage of all eyewear gadget services during the hours of 7:00 AM to 5:00 PM. Alternatively, certain services like playing a movie or other video on the device could be prohibited during those hours, but a voice-note service may remain enabled so that the student can take audio notes. Table 104 also indicates that when the user is in a movie theater location-type, usage of eyewear gadgets for video recording is prohibited at all times. The rationale for this usage restriction may be to prevent bootleg recordings, for instance. Table 104 also indicates that when the user is in a hospital, usage of eyewear gadgets for taking photographs is prohibited at all times.

GPS capabilities incorporated into wearable devices can be used to determine the user's location and correlate that location to maps or other known information about the area, in order to automatically determine the location-type in which the user is present. For instance, if the location of the device corresponds to that of a college campus, the location-type can be determined to be a school (college) and the appropriate usage restrictions applicable to that context can be discerned. Additionally or alternatively, location-type, or any other current usage parameter of the device, may be discerned based on local signals received by the device, such as Bluetooth® pings of similar signals (BLUETOOTH is a registered trademark of Bluetooth Special Interest Group, Kirkland, Wash., USA). The signals can indicate to the device information about its current context, such as in what type of location the device is present. By way of specific example, transmitters may be placed around a hospital facility to transmit an indication to wearable devices within the boundary of the hospital that the location-type is "hospital" and that usage restrictions applicable to such a location-type should be observed.

Continuing with FIG. 1, usage restriction table 106 depicts example user-type based restrictions. A user-type based restriction is related to a status, role, or activity of the user at a given time. In the example of table 106, the two user types shown are "driver" and "passenger" in a motor vehicle. As described above, a state law might prohibit usage of all services of an eyewear gadget, except GPS navigation, by the driver of a vehicle, but allow usage of the eyewear gadget by passengers in the vehicle.

Various methods can be used to determine a user type of the user of a wearable device. For instance, input from input component(s) of the device can be analyzed and a user-type can be discerned from that input. In the case of an eyewear gadget with a camera, the identification of the user-type can be based on input from a camera, in which images of the camera's view are analyzed. If a steering wheel and windshield is present in the central view of the device, the device might assume that the user is a driver of a motor vehicle, as an example.

Table 108 depicts example altitude-based usage restrictions. Airlines may desire to implement restrictions on device usage in flights and at certain altitudes. Table 108 prohibits all eyewear gadget service usage when altitude is 10,000 feet or lower, but allows all eyewear gadget service usage at altitudes from 10,001-40,000 feet.

Time based restrictions can exist as well. Time based usage restrictions can be standalone, for instance in their own table and without regard to other usage parameters like location, user-type and so on. Additionally or alternatively, time-based restrictions can be incorporated as further qualifications on other usage restrictions. Table 104 incorporates a time-based restriction in that the location-type "school" prohibits all eyewear gadget services during the hours of 7 AM to 5 PM (working hours). In another example, a school or workplace might wish to prohibit phone calls from being made by the device during working hours. In that example, the school or workplace might coordinate with the external cellular entity/company that runs the servers responsible for handling such cellular calls, to ensure that cellular capabilities are to be disabled for devices attempting to place calls or receive calls during those hours.

Additionally or alternatively, particular usage restrictions can be in place by default, and may be modified or expanded by additional customizations, for instance those setup by government laws, rules, or regulations, employer or school policies, parents or guardians, and so forth.

Usage restriction tables stored on the wearable devices can be periodically synchronized with external servers to keep the restrictions up-to-date with additions or changes to laws, regulations, and policies that relate to the devices. These external servers could be maintained by the device manufacturer, as one example, taking direction from municipalities, authorities, employers, and/or any other entities that dictate usage restrictions for the devices. Additionally or alternatively, the servers could be maintained by the municipalities, authorities, employers, etc. themselves. In other embodiments, an entity may function as a provider of the external servers to which the devices synchronize, and the municipalities, authorities, employers, etc. dictate to the provider the particular usage restrictions to be put into place.

Figure 2:
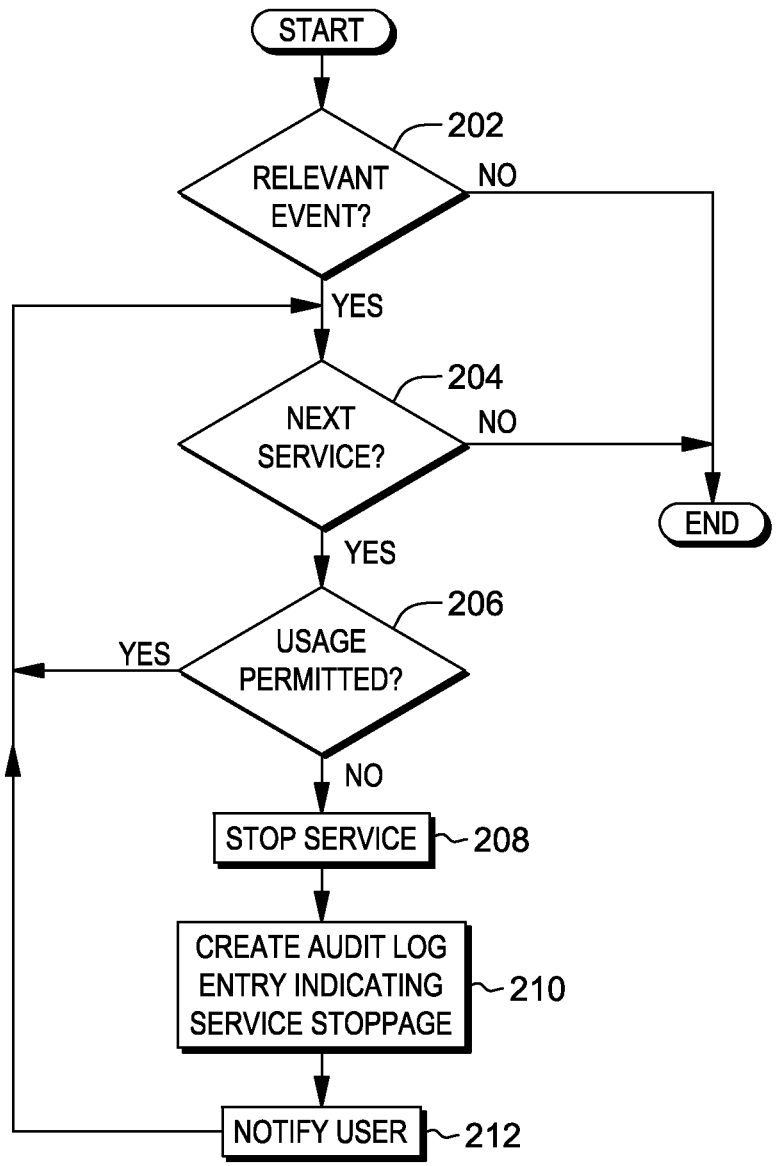
FIG. 2 depicts an example process for event-based device usage restriction enforcement, in accordance with aspects described herein.

As noted above, once usage restrictions have been established, events can trigger the enforcement of those restrictions. FIG. 2 depicts an example process for event-based device usage restriction enforcement, in accordance with aspects described herein. Various events can trigger the process of FIG. 2. A non-limiting list of such events includes: device power on, device resume from standby, a user's placement of the wearable device into operative position on the user's person, launch of a service, recognition of a defined gesture, a voice command, geographically triggered events such as entering or leaving a particular area (such as a state or a location-type like a hospital), entering/leaving a specific altitude, recognition of a changed user-type, or a time-based event trigger.

As a specific example, when a device is powered on, a check can be made as to which restrictions are present, then any services that are prohibited under the detected current usage parameters can be disabled (prevented from loading) or stopped, if execution has already begun. This may be useful with operating systems that, on startup, automatically load recent applications even after a power-on. It may also be useful when the operating system is configured to automatically load foundation or helper services that are preloaded and used at a later time by other services that are not immediately launched. Examples include those services loaded on startup for use by a GPS navigation program that is later-loaded by a user.

A resume from standby event is useful when usage parameters have changed such that a service that was previously enabled when the device went into standby is to be disabled under the updated (current) usage parameters. A specific example of this is when the device enters standby during playback of a video, and then the device is resumed from standby after the user begins driving his/her car in a state that prohibits video playback by the device when operated by a driver. When the device resumes from standby, the updated usage parameters (one of which is that the user-type has changed to "driver") warrant preventing resuming playback of the video while the driver is driving.

Turning now to FIG. 2, which depicts an example process for event-based device usage restriction enforcement, the process is triggered by an event, will check what services are in use, and, if a service is not permitted, will disable it and log an indication of that.

The process of FIG. 2 begins based on the system receiving an event. In some examples, the event is received from an input channel, such as the GPS, camera, microphone, or other component of the device. Additionally or alternatively, the event could be any event raised by an operating system or other process running on the device.

The process determines whether the event is a relevant event (202). As an example, it is determined whether the event has action(s) associated with it, as defined by the usage restrictions table(s). For instance, the event may indicate that the user entered the state of Washington. If entrance into the state of Washington is relevant to a usage restriction, the event is determined to be relevant. If the event is not relevant, the process ends. Otherwise, the process continues by processing each of the services in use by the device and stopping any that are prohibited under the current usage parameters. Example services include GPS navigation, video playback, web browsing, and camera usage. In some embodiments, one or more queries to the operating system prompt the operating system to indicate the services in use by the device.

Figure 5:
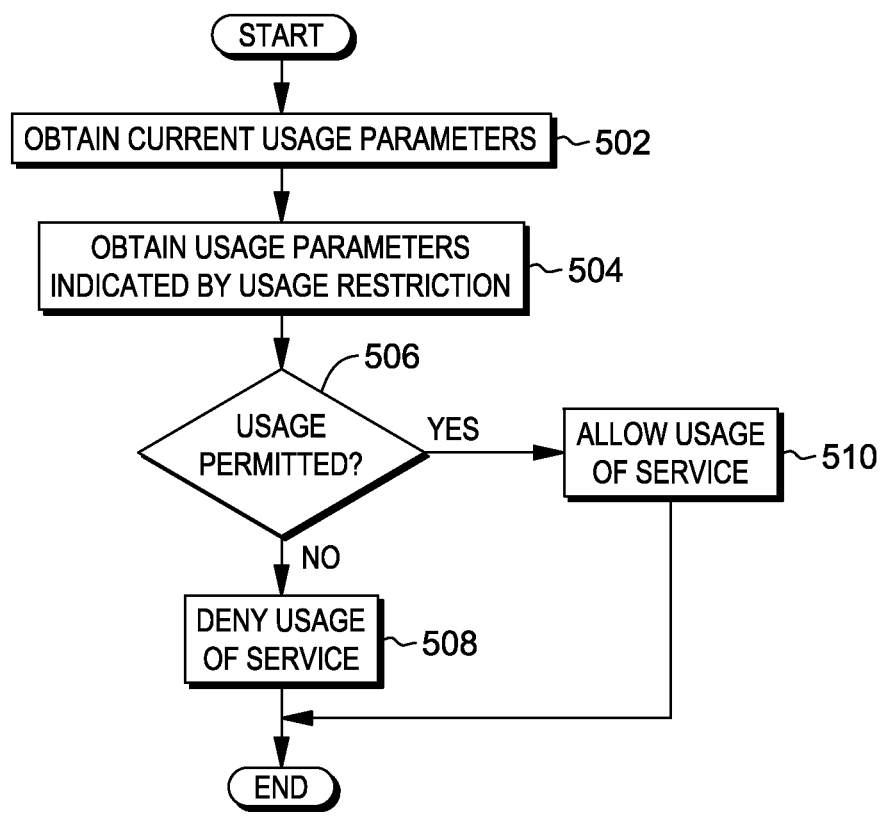
FIG. 5 depicts an example process for determining whether usage of a service is permitted based on current usage parameters, in accordance with aspects described herein.
Figure 6:
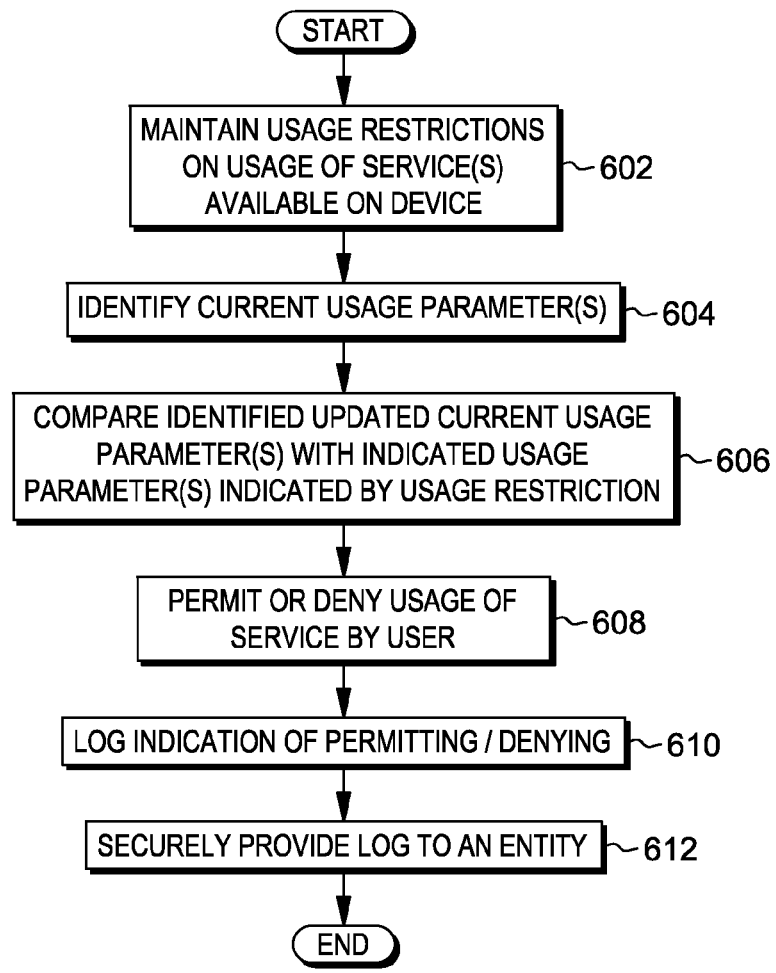
FIG. 6 depicts one example of process to selectively permit or deny usage of a service by a user, in accordance with aspects described herein.

Thus, it is determined at 204 whether a next service to process exists. If not, the process ends. Otherwise, the process determines whether usage of that service is permitted under the current usage parameters (206). This is achieved, in one aspect, by examining the usage restriction tables to determine whether the service is permitted or restricted. If neither is indicated, a default action may be applied. This process is explained in further detail below with reference to FIG. 5.

If usage of that service is permitted, then no action (i.e. to stop the service) is needed and the process returns to 204 to process a next service, if there are any more to process. Otherwise, usage of that service is not permitted (it is prohibited), therefore the process of FIG. 2 continues by stopping/disabling execution of the service (208), indefinitely disabling it from further execution, and creating an audit log entry indicating service stoppage (210). Reason(s) for the stoppage, current usage parameters, and other information may optionally be logged at this point.

Subsequently, the user is notified (212) about the restriction and the action taken to stop the service. In some examples, this notification is delivered via a voice, text, sound, tactile, and/or other alert. The process then returns to 204 to process a next service, if there are any more to process. When all services have been processed, inquiry 204 will determine that no next service to process exists, and the process of FIG. 2 will end.

Figure 3:
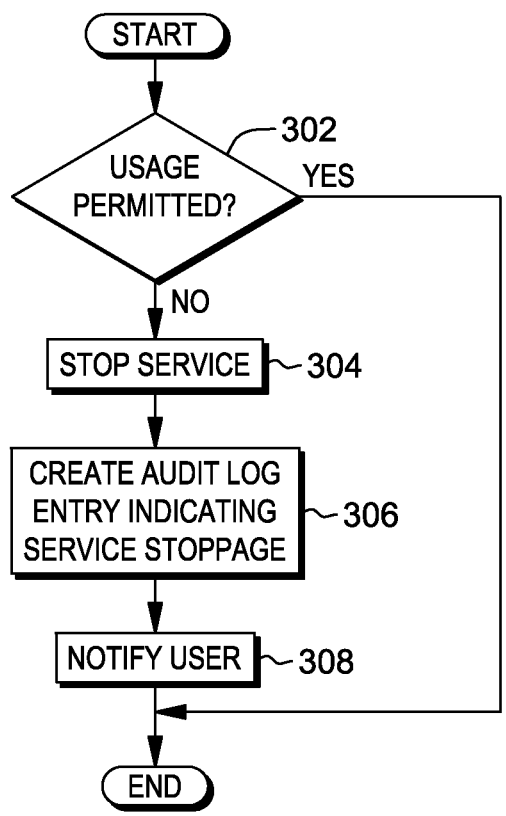
FIG. 3 depicts an example process for enforcing service usage restrictions based on an attempted service startup, in accordance with aspects described herein.

FIG. 3 depicts an example process for enforcing service usage restrictions based on an attempted service startup, in accordance with aspects described herein. The process of FIG. 3 is triggered by an event indicating the launch (or attempted launch) of a service. The process begins by determining whether usage of the service is permitted (302), as is explained in detail below with reference to FIG. 5. If usage of the service is permitted, the process ends, allowing the service to start/run. Otherwise, usage of the service is not permitted, and the system stops/disables usage of the service (304) and creates an audit log entry indicating service stoppage (306) and possibly other information. The user is then notified (308) about the restriction and the action taken to stop the service or prevent it from loading.

Figure 4:
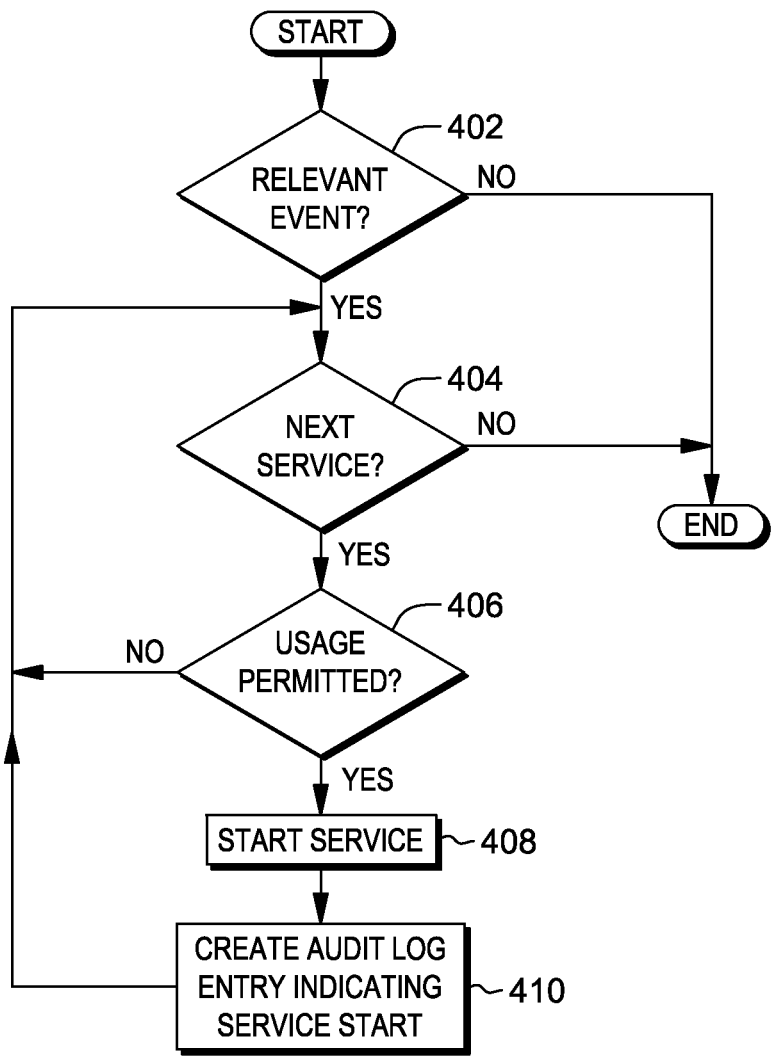
FIG. 4 depicts another example process for event-based usage restriction enforcement, in accordance with aspects described herein.

FIG. 4 depicts another example process for event-based usage restriction enforcement, in accordance with aspects described herein. FIG. 4 involves event-based triggering of a check of the currently disabled services, to determine whether one or more can be enabled. This is useful when, for instance, updated current usage parameters allow a previously disabled service to be automatically re-enabled for use. It is a converse of FIG. 2 described above; the process is triggered by an event, will check what services are currently disabled, and, if a service is permitted under the current usage parameters, will enable use of the service and log an indication of that.

In some embodiments, the device maintains an indication of services that were automatically disabled previously, and performs the process of FIG. 4 for these services upon detecting a later event.

The process of FIG. 4 begins based on the system receiving an event. As before, the event may be received from an input channel, such as the GPS, camera, microphone, or other component of the device, and/or could be any event raised by an operating system or other process running on the device.

The process determines whether the event is a relevant event (402), i.e. by determining whether the event has action(s) associated with it, as defined by the usage restrictions table(s). Using the example above, the event may be one indicating that the user has 'left the state of Washington' (after having previously entered the state of Washington). Exit from the state of Washington may be relevant to a usage restriction. For instance, exit from the state of Washington may occur based upon the user's entrance into the state of Oregon, which may not have a restriction on eyewear gadget usage while driving. If the event is determined not to be relevant, the process ends. Otherwise, the process continues by processing each of the disabled services and starting (or at least enabling for startup) any that are not prohibited under the current usage parameters.

Thus, it is determined at 404 whether a next service to process exists. If not, the process ends. Otherwise, the process determines whether usage of that service is permitted under the current usage parameters (406), e.g. using the process of FIG. 5. This is achieved, in one aspect, by examining the usage restriction tables to determine whether the service is permitted or restricted. If neither is indicated, a default may be applied.

If usage of that service is not permitted (usage of the service is to remain disabled), then no action is needed and the process returns to 404 to process a next service, if there are any more to process. Otherwise, usage of that service is permitted (it is not prohibited), and the process of FIG. 4 continues by starting the service (408). In some examples, the device can be configured to automatically start the service (408), while in other examples, the device may prompt the user to confirm that the service should be started prior to starting the service.

Alternatively, instead of starting the service, the device may merely enable the usage of that service, for instance by removing any restriction to the user starting that service. In examples where the service is facilitated by an external facility, such as a server that provides data/information to the device when using that service, enabling the service for use (408) may include the external facility being reconfigured to enable such use.

In any case, an audit log entry is created indicating service start (or enablement for execution) (410). As before, reason(s) for the stoppage, current usage parameters, and other information may optionally be logged at this point.

By way of specific example, assume a user is streaming a video to the user's eyewear gadget when the user enters his vehicle and turns on the ignition to begin driving. An event (such as establishment of a Bluetooth® connection of the eyewear gadget to the vehicle, and/or the eyewear gadget determining based on the camera view that the user has commenced operating the vehicle) may cause the video playback service to become disabled, ceasing playback of the video, based on a usage restriction indicating that video playback is to be disable for drivers. The process of FIG. 2 would be invoked and cause this playback to cease. Then, at some later time during the user's drive, the user attempts to resume playback of the video. The process of FIG. 3 would prevent the user from doing so, since playback of the video is disabled under the current usage parameters (driving). Finally, a later event (such as the Bluetooth® connection of the eyewear gadget to the vehicle being lost, and/or the eyewear gadget determining based on the camera view that the user is no longer operating the vehicle) may cause the video playback service to become enabled, thereby resuming playback of the video. The process of FIG. 4 would cause this playback to resume.

As described above, a determination is made as to whether a given service is to be enabled or disabled for use given a current usage context of the wearable device. This is described with reference to FIG. 5, which depicts an example process for determining whether usage of a service is permitted based on current usage parameters, in accordance with aspects described herein.

The process begins by obtaining the current usage parameters of the device (502). In some examples, the system reads parameter values from inputs channels. This may include reading the device's location from the GPS component of the device, determining the current time, or analyzing the current activity of the user based on images taken using the device's camera, as examples. Next, the device obtains usage parameters indicated by the usage restriction(s). In the example of FIG. 1, usage parameters for video recording include location (see table 102—prohibited for drivers in certain locales), location type (see table 104—prohibited in schools from 7 AM to 5 PM), user type (see table 106—prohibited for drivers but not passengers) and altitude (see table 106—disabled in-flight when below 10,000 feet).

Once the current usage parameters of the device and the usage parameters relevant for permitting/denying usage of the service are determined, the process continues by determining whether usage is permitted (506). In some examples, the device compares the input values from input channels of the device (the current usage parameters) against the restricted usage parameters (ex: driver trying to play video). If a usage restriction indicates that the service (e.g. video playback for a user driving a vehicle) is to be disabled given the current usage parameters, usage of the service is denied (508). Otherwise, usage of the service is allowed (510).

Denial or allowance of the usage of a service could include starting/stopping execution of the service, or enabling/disabling execution of the service at a later time. In this regard, a user may not currently be playing a video (the service is stopped), yet the ability to play video (use the video playback service) may be enabled/disabled, for instance using an indicator.

Figure 7:
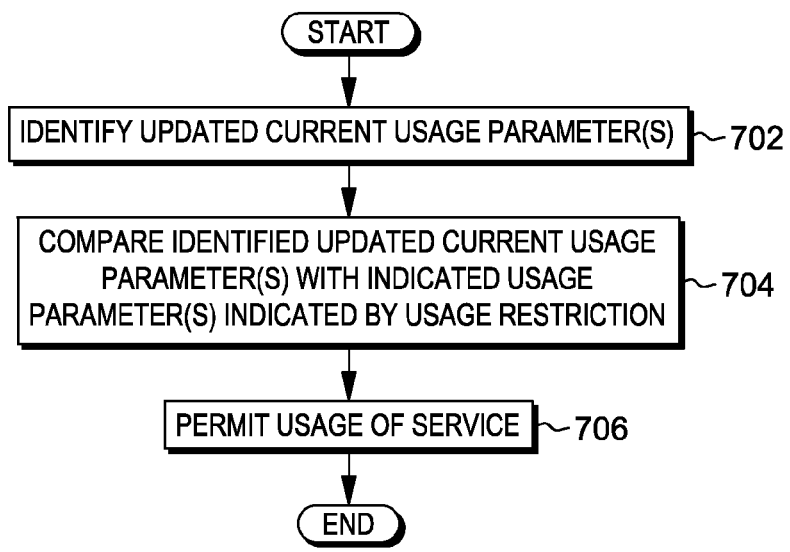
FIG. 7 depicts an example process of enabling usage of a service based on updated current usage parameters, in accordance with aspects described herein.

Described herein are examples of selectively permitting or denying a user's usage of a service. FIG. 7 depicts an example such process for selectively permitting or denying a user's usage of a service. The process begins by maintaining a set of usage restrictions on usage of service(s) available on a device (602). In some examples, the device is a wearable device. The usage restrictions may include customizable restrictions on usage of the service(s) available on the device. A usage restriction for a service indicates one or more usage parameters of the device under which the service is usable or is unusable to users of the wearable device. Guided navigation for the user, and capture/view of images or video, are example such services, though aspects described herein are applicable to many other services and types of services.

The process continues by identifying current usage parameter(s) of the device (604). This identification may be based on detecting an event associated with the device. An example such event might be an update to a current usage parameter of the device, such as a change in location of the wearable device.

The identified current usage parameter(s) and the indicated usage parameter(s) indicated by the usage restriction are compared (606) to determine whether the service is to be usable or unusable. Based on this comparison, usage of the service by a user of the device is permitted or denied (608), for instance by starting the service or stopping the service, respectively.

An indication of the permitting or denying is logged (610). The log may be securely maintained to facilitate preventing modification thereof by the user and reinforce its veracity to establish whether a given service was permitted or denied use at a given time. The log may then be securely provided to an entity (612) to facilitate establishing timeframes during which usage of a service of the service(s) of the device was selectively permitted or denied.

In some examples, input is obtained from a sensor of the device and the obtained input from the sensor is used to determine a current usage parameter of the identified current usage parameter(s) of the device. In a specific example, the sensor comprises a camera and the obtained input includes images taken by the camera. The usage restriction can indicate an activity-based parameter corresponding to an activity, and determining the current usage parameter can include obtaining more image(s) using the camera, performing an analysis on the obtained image(s), and then determining, based on the analysis, that the user is engaging in the activity or that the user is not engaging in that activity.

As explained above, usage of the service may be dependent on access by the device to a facility of a remote system, such as when the deice accesses data or information from the remote system and needed for usage of the service of the device. The selectively permitting or denying in this case can include denying usage of the service, and the denying can include disabling, at the remote system, access by the device to the facility of the remote system.

Also as explained above, the usage restriction can indicate at least one of a time-based usage parameter, a location-based usage parameter, or an activity-based usage parameter. Permitting or denying usage of the service can be based on at least one of a current time, a location of the wearable device, or an activity of a user, determined at least in part based on input from one or more input channels.

In some cases, the usage restriction indicates a location-based parameter corresponding to a geographic jurisdiction, and permitting or denying usage of the service is based on a legal or regulatory requirement of that geographic jurisdiction. Examples provided above include a state banning drivers of motor vehicles within that state from using particular services of a wearable device.

In some cases, the usage restriction indicates a location-based parameter corresponding to a type of facility in which the device is located, and permitting or denying usage of the service is based on a device usage policy of that type of facility. Additionally or alternatively, the usage restriction indicates an activity-based parameter corresponding to an activity in which the user is engaging, and permitting or denying usage of the service is based on whether the user is determined to be engaging in the activity.

The set of usage restrictions applicable to a device can be updated occasionally. This update can be based on a legal or regulatory authority implementing a limitation against usage of one or more services of the collection of services of that device. For instance, a jurisdiction may implement updated rules about the type of services that are permitted or denied in given situations. These updates can be automatically pushed out to devices by the external servers to which the devices synchronize.

FIG. 7 depicts an example process of enabling usage of a service based on updated current usage parameters, in accordance with aspects described herein. In some cases, this process is performed subsequent to temporarily denying usage of a service, for instance after updated current parameters are detected. Thus, based on detecting another event associated with the device, updated current usage parameter(s) are identified (702). The updated current usage parameter(s) can include updates to previously identified current usage parameters. A previously identified current usage parameter might have been the user entering the state of Washington, while the updated usage parameter can include an update to that usage parameter, e.g. the user leaving the state of Washington and entering a different state.

The identified updated current usage parameter(s) and the indicated usage parameter(s) indicated by the usage restriction are compared (704) to determine whether the service is to be usable or unusable. The comparing can determine that the service is to be usable based on the identified at least one updated current usage parameter, and based that comparison, usage of the service is permitted (706).

Aspects described herein advantageously enable automatic control over the usage of various services in wearable device and the enforcement of various combinations of usage restrictions involving parameters like location, location-type, user-type, time, altitude, and other parameters that provide context in which the service might execute on the device.

Figure 8:
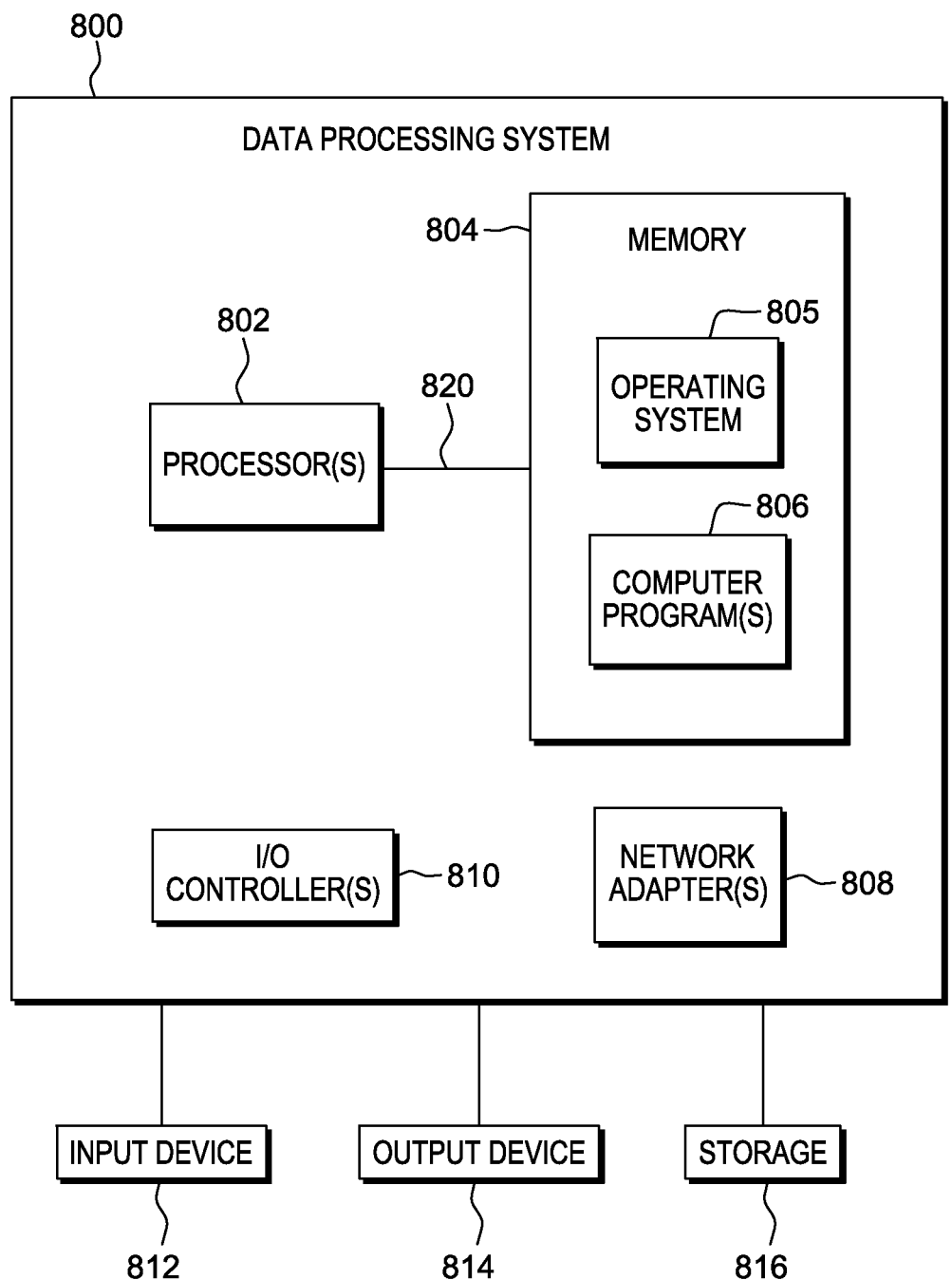
FIG. 8 depicts one example of a data processing system to incorporate and use aspects described herein.

FIG. 8 depicts one example of a data processing system to incorporate and use aspects described herein. Data processing system 800 may be based on, for instance, various system architectures such as those offered by International Business Machines Corporation (Armonk, N.Y., USA), Intel Corporation (Santa Clara, Calif., USA), or ARM Holdings plc (Cambridge, England, United Kingdom), as examples.

Data processing system 800 is suitable for storing and/or executing program code and includes at least one processor 802 coupled directly or indirectly to memory 804 through, e.g., a system bus 820. In operation, processor(s) 802 obtain from memory 804 one or more instructions for execution by the processors. Memory 804 may include local memory employed during actual execution of the program code, bulk storage, and cache memories which provide temporary storage of at least some program code in order to reduce the number of times code must be retrieved from bulk storage during program code execution. A non-limiting list of examples of memory 804 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 804 includes an operating system 805 and one or more computer programs 806, for instance services that execute and that are the subject of usage restrictions described herein.

Input/Output (I/O) devices 812, 814 (including but not limited to displays, microphones, speakers, accelerometers, gyroscopes, magnetometers, light sensors, proximity sensors, GPS devices, cameras, etc.) may be coupled to the system either directly or through I/O controllers 810.

Network adapters 808 may also be coupled to the system to enable the data processing system to become coupled to other data processing systems, storage devices, or the like through intervening private or public networks. Ethernet-based (such as Wi-Fi) interfaces and Bluetooth® adapters are just examples of the currently available types of network adapters 808 used in wearable devices.

Data processing system 800 may be coupled to storage 816 (e.g., a non-volatile storage area, such as magnetic disk drives, optical disk drives, a tape drive, etc.), having one or more databases. Storage 816 may include an internal storage device or an attached or network accessible storage. Computer programs in storage 816 may be loaded into memory 804 and executed by a processor 802 in a manner known in the art.

The data processing system 800 may include fewer components than illustrated, additional components not illustrated herein, or some combination of the components illustrated and additional components. Data processing system 800 may include any computing device known in the art, such as a mainframe, server, personal computer, workstation, laptop, handheld or mobile computer, tablet, wearable device, telephony device, network appliance, virtualization device, storage controller, etc.

Figure 9:
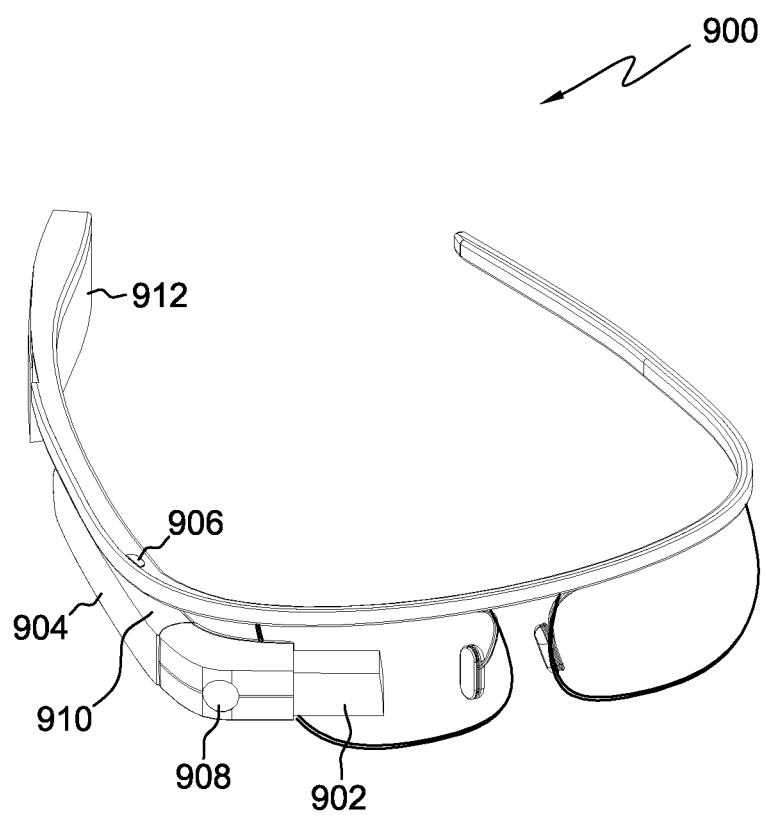
FIG. 9 depicts another example of a data processing system to incorporate and use aspects described herein.

FIG. 9 depicts another example of a data processing system to incorporate and use aspects described herein. FIG. 9 depicts an example eyewear gadget wearable device. Device 900 can include many of the same types of components included in data processing system 800 described above. In the example of FIG. 9, device 900 is configured to be wearable on the head of the device user. The device includes a display 902 that is positioned in the line of sight of the user when the device is in operative position on the user's head. Suitable displays can utilize LCD, CRT, or OLED display technologies, as examples.

Device 900 also includes touch input portion 904 that enable users to input touch-gestures in order to control functions of the device. Such gestures can be interpreted as commands, for instance a command to take a picture, or a command to launch a particular service. Device 900 also includes button 906, in order to control function(s) of the device. Example functions include locking, shutting down, or placing the device into a standby or sleep mode.

Various other input devices are provided, such as camera 908, which can be used to capture pictures and/or record video. The camera can also be used by the device to obtain an image of the user's view of his or her environment to use in, for instance, a determination of the current context under which services of the device are executing or attempting to be executed. One or more microphones, proximity sensors, light sensors, accelerometers, speakers, GPS devices, and/or other input devices (not labeled) may be additionally provided, for instance within housing 910. Housing 910 can also include other electronic components, such as electronic circuitry, including processor(s), memory, and/or communications devices, such as cellular, short-range wireless (e.g. Bluetooth), or WiFi circuitry for connection to remote devices. Housing 910 can further include a power source, such as a battery to power components of device 900. Additionally or alternatively, any such circuitry or battery can be included in enlarged end 912, which may be enlarged to accommodate such components. Enlarged end 912, or any other portion of device 900, can also include physical port(s) (not pictured) used to connect device 900 to a power source (to recharge a battery) and/or any other external device, such as a computer. Such physical ports 480 can be of any standardized or proprietary type, such as Universal Serial Bus (USB).

The present invention may be a system, a method, and/or a computer program product. The computer program product may include a computer readable storage medium (or media) having computer readable program instructions thereon for causing a processor to carry out aspects of the present invention.

Figure 10:
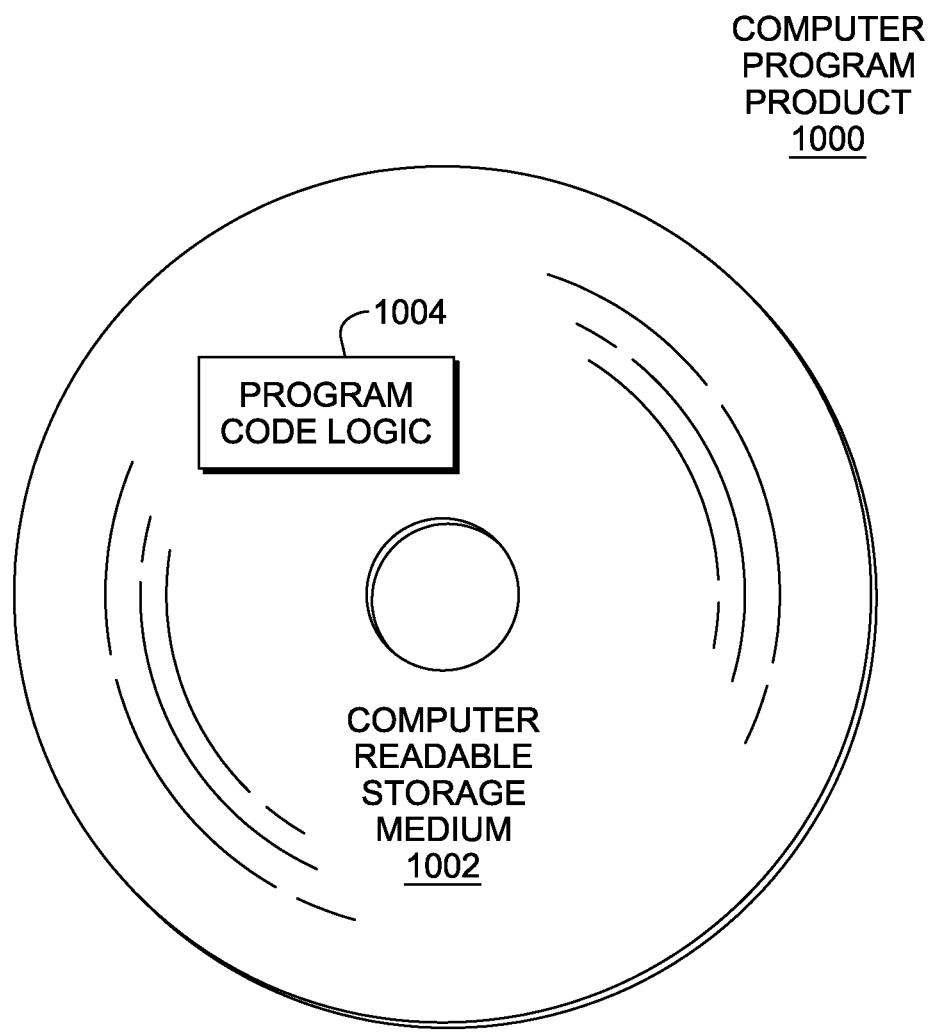
FIG. 10 depicts one embodiment of a computer program product incorporating aspects described herein.

Referring to FIG. 10, in one example, a computer program product 1000 includes, for instance, one or more non-transitory computer readable storage media 1002 to store computer readable program code means, logic and/or instructions 1004 thereon to provide and facilitate one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
    maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device enabling or disabling usage of the service by at least one user of the wearable device;
    detecting an event associated with the wearable device, the event indicating an update to at least one current usage parameter of the wearable device, the update to the at least one current usage parameter describing an updated usage context in which the wearable device is being used;
    based on determining that the update to the at least one current usage parameter is relevant to the usage restriction for the service, comparing the updated at least one current usage parameter and the indicated at least one usage parameter indicated by the usage restriction to determine whether the service is to be enabled or disabled for usage by the at least one user of the wearable device;
    enabling or disabling the service for usage based on the comparing, and
    based on an attempt by the at least one user to use the service, permitting or denying, the attempt to use the service.

2. The method of claim 1, further comprising logging an indication of the permitting or denying in a log being securely maintained to facilitate preventing modification thereof by the user.

3. The method of claim 2, further comprising securely providing the log to an entity to facilitate establishing timeframes during which usage of the service was permitted or denied.

4. The method of claim 1, wherein the update to the at least one current usage parameter comprises a change in location of the wearable device.

5. The method of claim 1, further comprising obtaining input from a sensor of the wearable device and using the obtained input from the sensor to determine the updated at least one current usage parameter of the wearable device.

6. The method of claim 5, wherein the sensor comprises a camera, wherein the usage restriction indicates an activity-based parameter corresponding to an activity, and wherein determining the updated at least one current usage parameter comprises:
    obtaining one or more images using the camera;
    performing an analysis on the obtained one or more images, the analysis comprising analyzing one or more views of the camera for presence or absence of objects suggesting a correlation to the at least one usage parameter indicated by the usage restriction; and
    determining, based on the analysis, that the user is engaging in the activity or that the user is not engaging in that activity.

7. The method of claim 1, wherein the service comprises a service to provide guided navigation to the user, or a service to capture or view images or video.

8. The method of claim 1, wherein usage of the service is dependent on access by the wearable device to a facility of a remote system, wherein the permitting or denying comprises denying the attempt to use the service, and wherein the denying comprises disabling, at the remote system, access by the wearable device to the facility of the remote system.

9. The method of claim 1, wherein the usage restriction indicates at least one of a time-based usage parameter, a location-based usage parameter, or an activity-based usage parameter, and wherein permitting or denying the attempt to use the service is based on at least one of a current time, a location of the wearable device, or an activity of a user, determined at least in part based on input from one or more input channels.

10. The method of claim 9, wherein the usage restriction indicates a location-based parameter corresponding to a geographic jurisdiction, and wherein permitting or denying the attempt to use the service is based on a legal or regulatory requirement of that geographic jurisdiction.

11. The method of claim 9, wherein the usage restriction indicates a location-based parameter corresponding to a type of facility in which the wearable device is located, and wherein permitting or denying the attempt to use the service is based on a wearable device usage policy of that type of facility.

12. The method of claim 9, wherein the usage restriction indicates an activity-based parameter corresponding to an activity in which the user is engaging, and wherein permitting or denying the attempt to use the service is based on whether the user is determined to be engaging in the activity.

13. The method of claim 1, further comprising updating the set of usage restrictions based on a jurisdictional legal authority implementing a jurisdictional legal limitation against usage of one or more services available on the wearable device.

14. The method of claim 1, wherein the permitting or denying temporarily denies usage of the service, and wherein the method further comprises, subsequent to performing the permitting or denying:
based on detecting another update to the at least one current usage parameter, comparing the updated at least one current usage parameter and the indicated at least one usage parameter indicated by the usage restriction to determine whether the service is to be enabled or disabled for usage, wherein the comparing determines that the service is to be enabled for usage based on the another update to the at least one current usage parameter; and
permitting, based the comparing, a subsequent attempt to use the service.

15. A computer system comprising:
a memory; and
a processor in communication with the memory, wherein the system is configured to perform a method comprising:
maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device enabling or disabling usage of the service by at least one user of the wearable device;
detecting an event associated with the wearable device, the event indicating an update to at least one current usage parameter of the wearable device, the update to the at least one current usage parameter describing an updated usage context in which the wearable device is being used;
based on determining that the update to the at least one current usage parameter is relevant to the usage restriction for the service, comparing the updated at least one current usage parameter and the indicated at least one usage parameter indicated by the usage restriction to determine whether the service is to be enabled or disabled for usage by the at least one user of the wearable device;
enabling or disabling the service for usage based on the comparing; and
based on an attempt by the at least one user to use the service, permitting or denying the attempt to use the service.

16. The computer system of claim 15, wherein the method further comprises obtaining input from a sensor of the wearable device and using the obtained input from the sensor to determine the updated at least one current usage parameter of the wearable device, wherein the sensor comprises a camera, wherein the usage restriction indicates an activity-based parameter corresponding to an activity, and wherein determining the updated at least one current usage parameter comprises:
obtaining one or more images using the camera;
performing an analysis on the obtained one or more images, the analysis comprising analyzing one or more views of the camera for presence or absence of objects suggesting a correlation to the at least one usage parameter indicated by the usage restriction; and
determining, based on the analysis, that the user is engaging in the activity or that the user is not engaging in that activity.

17. The computer system of claim 15, wherein the usage restriction indicates a location-based parameter, wherein permitting or denying the attempt to use the service is based on a location of the wearable device corresponding to a geographic jurisdiction and based further on a legal requirement of that geographic jurisdiction, and wherein the method further comprises updating the set of usage restrictions based on a jurisdictional legal authority implementing a jurisdictional legal limitation against usage of one or more services of the collection of services.

18. The computer system of claim 15, wherein the permitting or denying temporarily denies usage of the service, and wherein the method further comprises, subsequent to performing the permitting or denying:
based on detecting another update to the at least one current usage parameter, comparing the updated at least one current usage parameter and the indicated at least one usage parameter indicated by the usage restriction to determine whether the service is to be enabled or disabled for usage, wherein the comparing determines that the service is to be enabled for usage based on the another update the at least one updated current usage parameter; and
permitting, based the comparing, a subsequent attempt to use the service.

19. A computer program product comprising a non-transitory computer readable storage medium having program instructions embodied therewith, the program instructions executable by a processor to cause the processor to perform a method comprising:
maintaining a set of usage restrictions on usage of one or more services available on a wearable device, the usage restrictions comprising customizable restrictions on usage of the one or more services available on the wearable device, wherein a usage restriction for a service of the one or more services indicates at least one usage parameter of the wearable device enabling or disabling usage of the service by at least one user of the wearable device;
detecting an event associated with the wearable device, the event indicating an update to at least one current usage parameter of the wearable device, the update to the at least one current usage parameter describing an updated usage context in which the wearable device is being used;

based on determining that the update to the at least one current usage parameter is relevant to the usage restriction for the service, comparing the updated at least one current usage parameter and the indicated at least one usage parameter indicated by the usage restriction to determine whether the service is to be enabled or disabled for usage by the at least one user of the wearable device;

enabling or disabling the service for usage based on the comparing; and based on an attempt by the at least one use to use the service, permitting or denying the attempt to use the service.

\* \* \* \* \*